United States Patent
Watanabe et al.

(10) Patent No.: US 8,096,798 B2
(45) Date of Patent: Jan. 17, 2012

(54) GAS HYDRATE COMPRESSION MOLDING MACHINE

(75) Inventors: Kenji Watanabe, Tamano (JP); Kiyoaki Suganoya, Tamano (JP); Takahiro Yoshida, Tamano (JP); Kenji Ogawa, Tokyo (JP); Shigeru Nanbara, Hiroshima (JP); Shinji Imai, Hiroshima (JP)

(73) Assignees: Mitsui Engineering & Shipbuilding Co., Ltd., Tokyo (JP); The Chugoku Electric Power Co., Inc., Hiroshima (JP)

( * ) Notice: Subject to any disclaimer, the term of this patent is extended or adjusted under 35 U.S.C. 154(b) by 59 days.

(21) Appl. No.: 12/450,448

(22) PCT Filed: Mar. 28, 2008

(86) PCT No.: PCT/JP2008/056245
§ 371 (c)(1),
(2), (4) Date: Sep. 25, 2009

(87) PCT Pub. No.: WO2008/120768
PCT Pub. Date: Oct. 9, 2008

(65) Prior Publication Data
US 2010/0062094 A1 Mar. 11, 2010

(30) Foreign Application Priority Data

Mar. 30, 2007 (JP) ................... 2007-095674

(51) Int. Cl.
*B29C 43/36* (2006.01)
(52) U.S. Cl. ................. 425/77; 425/363; 425/367
(58) Field of Classification Search ............... 425/77, 425/115, 317, 363–375, 177
See application file for complete search history.

(56) References Cited

FOREIGN PATENT DOCUMENTS

| JP | 01-110289 | * | 4/1989 |
|---|---|---|---|
| JP | 2002-220353 A1 | | 8/2002 |
| JP | 2006-104256 A | | 4/2006 |
| JP | 2007-077253 A | | 3/2007 |
| JP | 2007-262144 A | | 10/2007 |
| WO | WO 2009/047848 | * | 4/2009 |

* cited by examiner

*Primary Examiner* — Richard Crispino
*Assistant Examiner* — Thukhanh Nguyen
(74) *Attorney, Agent, or Firm* — Jacobson Holman PLLC

(57) ABSTRACT

A molding machine for production of gas hydrate pellets under a high pressure in gas hydrate forming conditions, which is inexpensive through minimizing of the use of expensive mechanical seal. The molding machine comprises two forming rolls each fitted to a rotary shaft whose both ends are supported by bearings; a drive unit for rotating the forming rolls; a screw transfer unit for supplying powder to the forming rolls; and a high-pressure vessel, wherein the bearings, the rotary shaft and the forming rolls are all disposed in the high-pressure vessel.

4 Claims, 5 Drawing Sheets

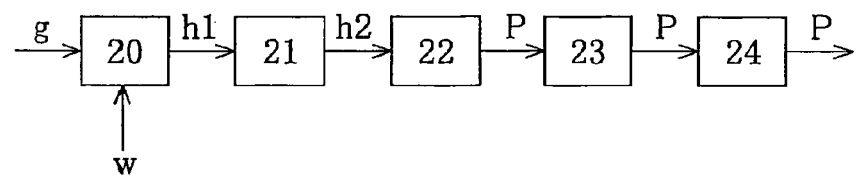
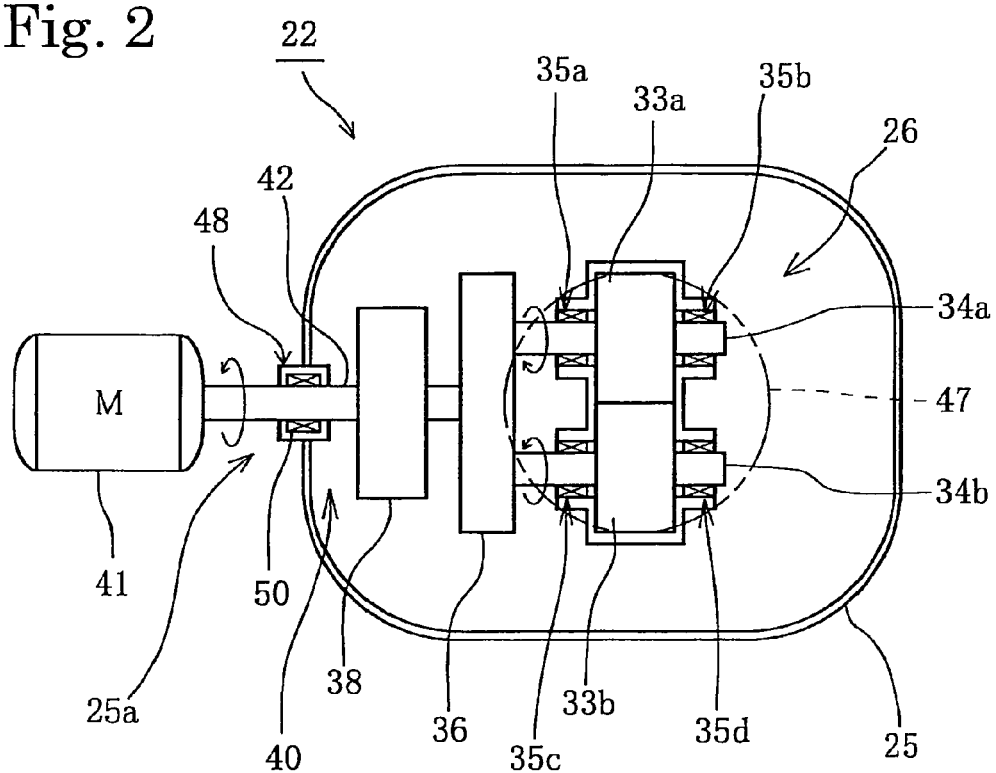

Prior Art

GAS HYDRATE COMPRESSION MOLDING MACHINE

CROSS-REFERENCE TO RELATED APPLICATIONS

This is a national stage of PCT/JP08/056,245 filed Mar. 28, 2008 and published in Japanese, which has a priority of Japanese no. 2007-095674 filed Mar. 30, 2007, hereby incorporated by reference.

BACKGROUND OF THE INVENTION

1. Field of the Invention

The present invention relates to a molding machine for molding a gas hydrate by compression molding, and more specifically to a molding apparatus suitable for making pellets by compression molding of a gas hydrate in a high-pressure gas atmosphere.

2. Description of Related Art Including Information Disclosed Under 37 CFR §§1.97 and 1.98

Generally molding pellets by compressing powder adopts a molding apparatus having a pair of forming rolls having molding concavities on the surface thereof. As shown in FIG. 6, for example, the molding apparatus has a casing 4 which contains two forming rolls 6a and 6b being arranged closely to each other, a feed opening 2 for the powder a at the upper part of the casing 4, and a discharge opening 3 for the pellets, which were formed by compression molding, at the lower part of the casing 4.

In the molding apparatus 1 having the above structure, the powder a is supplied to the forming rolls 6a and 6b by a screw transfer unit 16. The powder a is pressed and compacted in the molding concavities formed on the surface of the respective rolls 6a and 6b to become pellets P, which pellets P are then discharged from the discharge opening 3.

The applicant of the present invention has already proposed a method for increasing the filling rate of gas hydrate, for improving the stability and safety during transportation and storage of the gas hydrate, or for improving the handling of the gas hydrate loading/unloading through the procedure that a raw material gas, containing methane as a principal component, such as natural gas, is brought into gas-liquid contact with water, under a specified pressure and temperature condition (for example, 5.4 MPa and 4° C.), to thereby form the gas hydrate, which gas hydrate is then molded into pellets through the compression molding by a pair of rotary rolls in said pressure atmosphere (for example, Patent Document 1).

Patent Document 1: Japanese Patent Application Kokai Publication No. 2002-220353

BRIEF SUMMARY OF THE INVENTION

Problems to be Solved by the Invention

When the above-described conventional molding apparatus is used for pelletizing a powder in a high-pressure atmosphere, since the raw material gas is a flammable gas or an ignitable gas like methane, there are requirements for providing each of bearings with a mechanical seal so as not to allow the leak of the high-pressure gas through said bearing parts, which results in an expensive molding apparatus.

Means to Solve the Problems

The present invention has been perfected to solve the above conventional problems and has features of (1) a gas hydrate compression molding apparatus comprising: a hopper which holds gas hydrate formed by the reaction of a raw material gas with a raw material water under a high pressure; a pair of forming rolls positioned at the upper portion of an opening part of the hopper; and a screw transfer unit which supplies gas hydrate powder in said hopper to said forming rolls, wherein said forming rolls are positioned in a high-pressure vessel which can pressurize thereof to said gas hydrate-forming pressure; (2) the gas hydrate compression molding apparatus in which said screw transfer unit is positioned in said high-pressure vessel; (3) the gas hydrate compression molding apparatus in which a driving unit for driving said forming rolls is positioned in said high-pressure vessel; and (4) the gas hydrate compression molding apparatus in which a driving machine forming the driving unit for driving said forming rolls and/or a driving machine for driving said screw transfer unit is a hydraulic motor.

Effect of the Invention

According to the invention, since the forming rolls are positioned in the high-pressure vessel allowing pressurizing thereof to a gas hydrate-forming pressure, there is no need of applying expensive mechanical seal, and thus the utility cost can be reduced.

Furthermore, only a simple modification that the conventionally used molding machine is positioned in the high-pressure vessel allows the conventional molding machine to be used under a high-pressure under which the gas hydrate forms.

According to one aspect of the invention, the screw transfer unit is positioned in the high-pressure vessel so that the screw shaft of the screw transfer unit does not penetrate through the high-pressure vessel. That is, there is no need of mounting a seal mechanism such as mechanical seal at a part where the screw shaft penetrates through the high-pressure vessel, which further suppresses the fabrication cost, and further prevents gas leak through the penetration part of the screw shaft.

According to another aspect of the invention, since the driving unit for the forming rolls is positioned in the high-pressure vessel, the drive shaft of the driving unit does not penetrate through the high-pressure vessel. Accordingly, at the part where the drive shaft penetrates through the high-pressure vessel, seal mechanism such as mechanical seal need not be mounted, thus the cost increase is prevented, and the gas leak from said penetrating part is not generated.

According to still another aspect of the invention, the driving machine of the driving unit adopts a hydraulic motor so that a spark which is observed in an electric motor is not generated, and thus there is no danger of ignition and explosion in the high-pressure vessel even in a high-pressure and flammable gas atmosphere.

BRIEF DESCRIPTION OF THE DRAWINGS

FIG. 1 shows the system of production apparatus for natural gas hydrate provided with the molding machine according to the present invention.

FIG. 2 shows a rough plan view of an embodiment of the molding machine according to the present invention.

DESCRIPTION OF THE REFERENCE SYMBOLS

Figure 3:
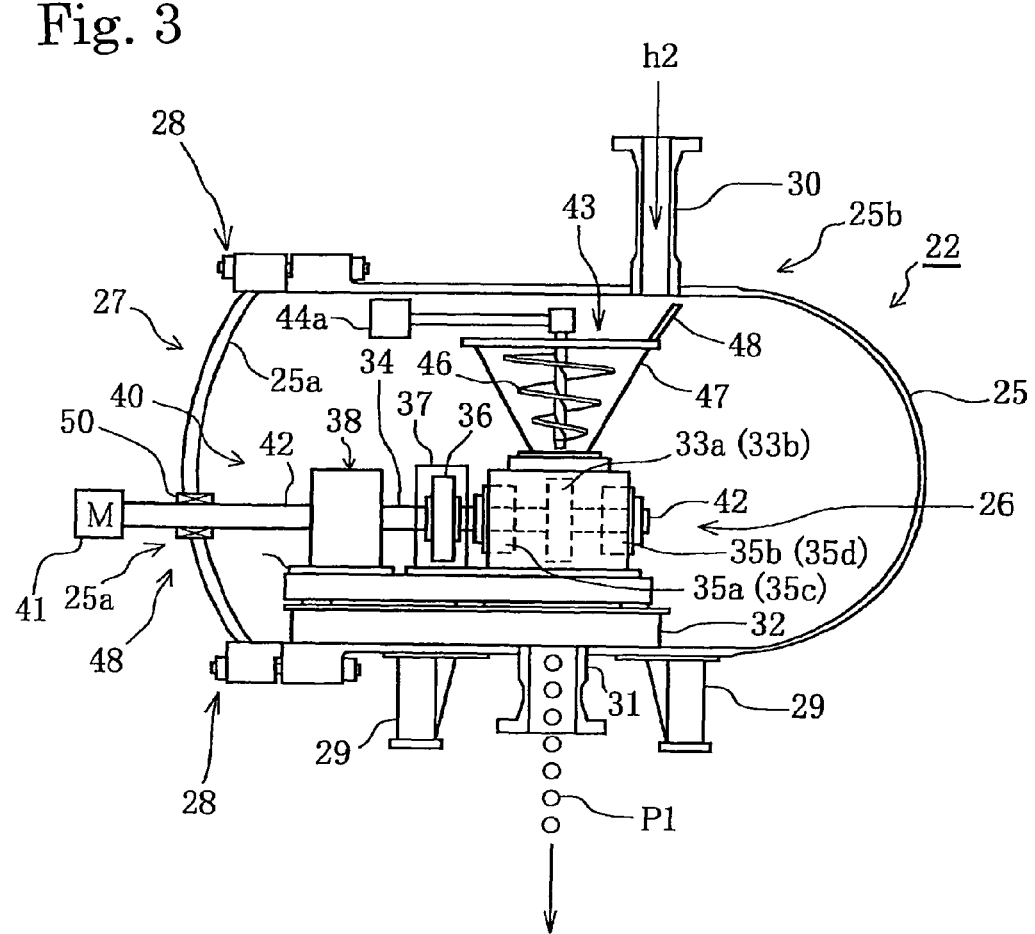
FIG. 3 shows a side view of an embodiment of the molding machine according to the present invention.

1, 22 molding apparatus
2, 30 supply opening
3, 31 discharge opening
4 casing
5a, 5b, 34, rotary shaft
42, 45
6a, 6b, forming roll
33a, 33b
7a, 7b, 7c, bearing
7d, 35a,
35b, 35c,
35d
8, 40 driving unit
9, 41, 42 electric motor
38 reduction gear
36 synchronous unit
13, 47 hopper
14 screw shaft
15, 46 screw
16, 43 screw transfer unit
20 slurry-forming apparatus
21 dewatering apparatus
22 molding apparatus
23 cooler
24 depressurizing apparatus
25 high-pressure vessel
26 molding machine
27 lid
28 bolt
29 support leg
32 frame
37, 39 support member
44a, 44b hydraulic motor
48 guide
50 mechanical seal

DETAILED DESCRIPTION OF THE INVENTION

The embodiments of the molding machine according to the present invention will be described below referring to FIGS. 1 to 4.

Example 1

FIG. 1 shows a system diagram of the gas hydrate production apparatus provided with the molding machine according to the present invention. In FIG. 1, the reference symbol 20 signifies the slurry-forming apparatus, 21 signifies the dewatering apparatus, 22 signifies the molding machine, 23 signifies the cooler, and 24 signifies the depressurizing apparatus.

Into the slurry-forming apparatus 20 maintained to a specified pressure and temperature (for example, 5.4 MPa and 4° C.), a raw material gas g and a raw material water w are introduced, and an agitation method or a bubbling method is applied to bring the raw material gas g and the raw material water w into contact reaction, and to form a slurry h1 containing gas hydrate.

Then, said slurry is dewatered in the dewatering apparatus 21 to prepare a gas hydrate h2 in powder form containing large amounts of gas hydrate.

Said powdery gas hydrate h2 is supplied to the molding apparatus 22 to produce pellets P having approximate lengths ranging from 5 to 30 mm. The gas hydrate pellets P are cooled by the cooler 23, (for example, to about −20° C.), and are then depressurized to atmospheric pressure (0.1 MPa) by the depressurizing apparatus 24. The depressurized pellets P are stored in a storage tank (not shown) positioned at the downstream side.

Next, the description will be given to the molding apparatus 22 of the gas hydrate, being applied to the gas hydrate production apparatus such as the one shown in FIG. 1, referring to FIGS. 2 and 3.

In FIGS. 2 and 3, the reference number 25 signifies a high-pressure vessel, which high-pressure vessel 25 is equipped with a lid 27 fixed by bolts 28. The high-pressure vessel 25 is mounted on a base (not shown) by support legs 29 positioned at the lower portion of the vessel 25. At the upper portion of said high-pressure vessel 25, a supply opening 30 for the powdery gas hydrate h2 is positioned. At the lower portion of said high-pressure vessel 25, a discharge opening 31 for discharging the pellets P is positioned In such structured high-pressure vessel 25, a frame 32 is positioned. On the frame 32, there are mounted a molding machine 26, a synchronous unit 36, and a reduction gear 38.

A driving unit 40 which rotates the forming rolls 33a and 33b forming said molding machine 26 is composed of an electric motor 41, the reduction gear 38, and the synchronous unit 36 equipped with a synchronous gear. A rotary shaft 42 of the electric motor 41 penetrates through a side wall 25a of said high-pressure vessel 25, and a mechanical seal 50 is provided at the penetrating part.

A screw transfer unit 43 is formed by a hopper 47 which holds the gas hydrate h2, and a screw 46 which supplies the gas hydrate h2 in the hopper 47. Said screw 46 is attached to a rotary shaft 45 of a hydraulic motor 44a located inside the high-pressure vessel 25. The hopper 47 of said screw transfer unit 43 has a guide 48 which introduces the gas hydrate h2 supplied from the supply opening 30 into the hopper 47.

In the molding apparatus 22 for the gas hydrate, having such structure, the internal pressure of the pressure vessel 25 is the same as that of said dewatering apparatus 21. Thus, the gas hydrate h2 supplied from the dewatering apparatus 21 can be smoothly supplied without ejection caused by a pressure difference.

The powdery gas hydrate h2 supplied from said dewatering apparatus 21 is supplied to the hopper 47 via the supply opening 30 and the guide 48. The gas hydrate h2 in the hopper 47 is fed under pressure in between the forming rolls 33a and 33b of the molding machine 26 by the screw transfer unit 43. The fed gas hydrate h2 under pressure is molded by compression molding in the molding concavities (not shown) to become the gas hydrate pellets P, which are then discharged from the discharge opening 31, and are stored in a storage tank or the like (not shown).

According to the example, since the rotary shaft penetrating through the high-pressure vessel 25 is located at only a single site of the electric motor 41 of the molding machine 26, the molding apparatus 22 can be fabricated at a low cost.

Furthermore, pellets can be produced without decomposing the gas hydrate in the high-pressure vessel 25, and without the leak of the gas hydrate therefrom.

Example 2

Figure 4:
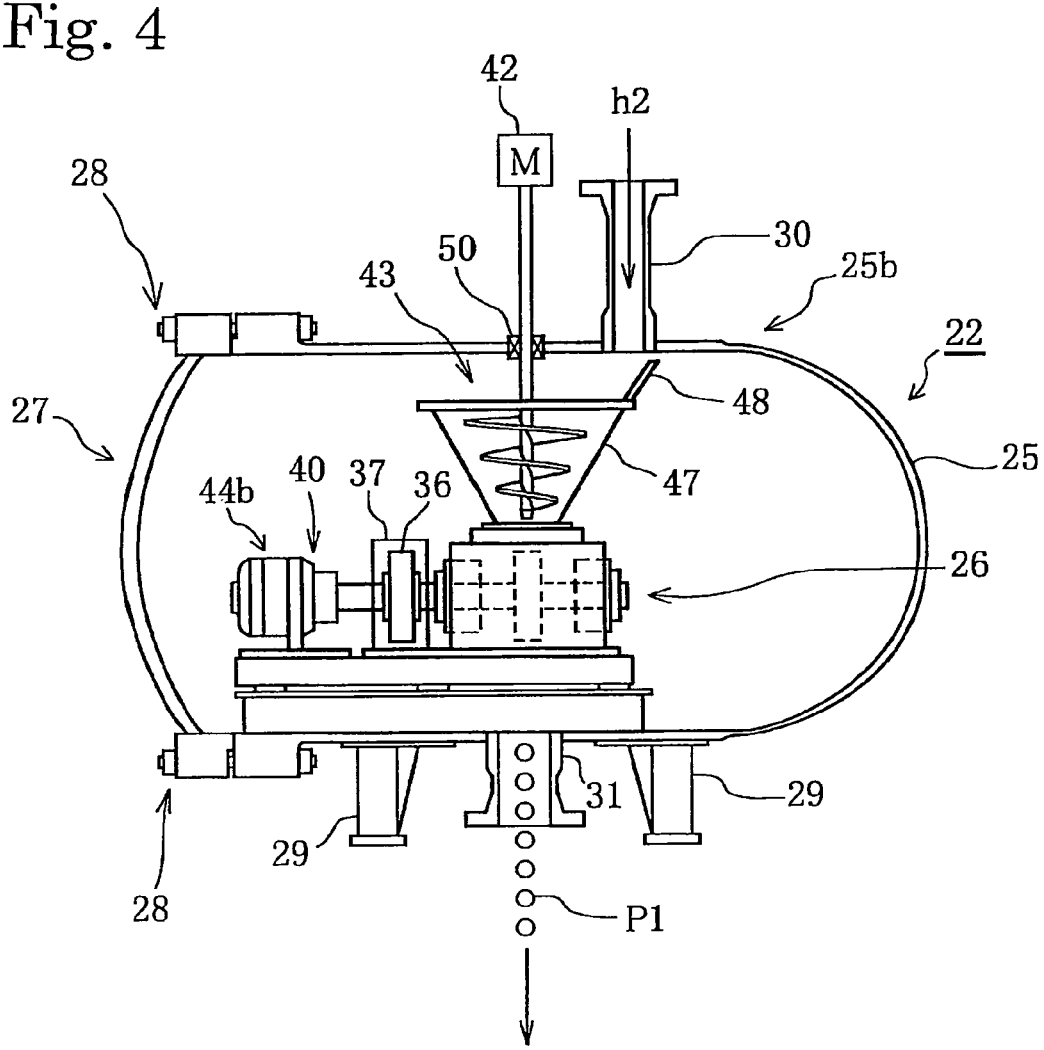
FIG. 4 shows a side view of another embodiment of the molding machine according to the present invention.

FIG. 4 shows a side view of further another embodiment of the molding apparatus according to the present invention. The same reference symbol as that of FIGS. 2 and 3 has the same name.

In the molding apparatus 22 in the embodiment replaces, the electric motor is replaced by a hydraulic motor 44b, and further the hydraulic motor 44b is positioned in the high-pressure vessel 25.

According to Example 2, since the rotary shaft penetrating through the high-pressure vessel 25 is only a single site of the rotary shaft 45 of the electric motor 42 of the screw transfer unit 43, the seal part is located at a single site. Consequently, the molding apparatus 22 can be fabricated at a low cost.

Furthermore, by switching the electric motor as the driving machine to the hydraulic motor, a possibility of explosion in the high-pressure vessel 25 is eliminated even if the internal atmosphere is flammable gas such as natural gas containing methane as a principal component.

Example 3

Figure 5:
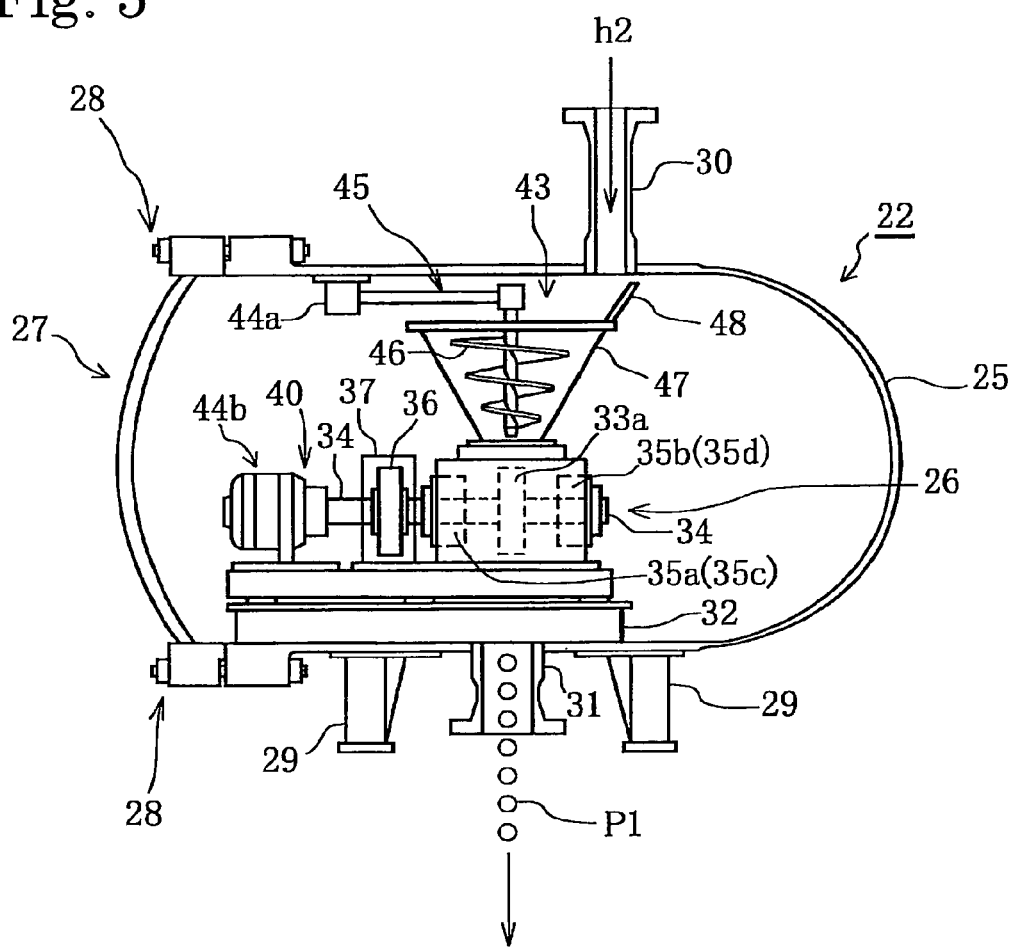
FIG. 5 shows a side view of further embodiment of the molding machine according to the present invention.
Figure 6:
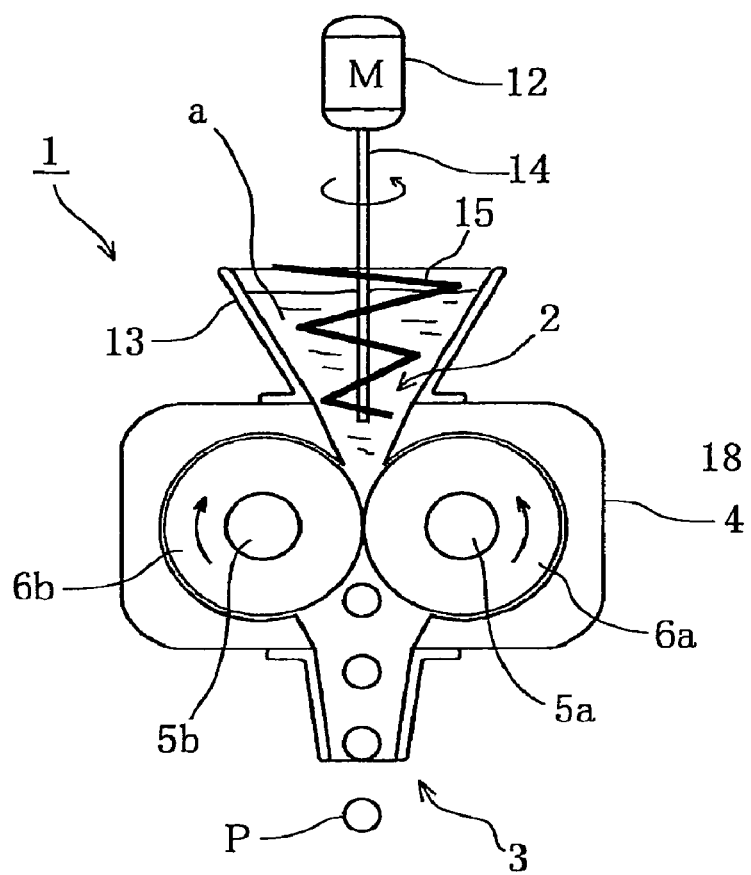
FIG. 6 shows a rough side view of the molding machine having the conventional forming rolls.

FIG. 5 shows a side view of further another embodiment of the molding apparatus according to the present invention. The same reference symbol as that of FIGS. 2 to 4 has the same name.

In the molding apparatus 22 in the embodiment, the driving unit 40 for the forming rolls 33a and 33b and the screw transfer unit 43, are positioned in the high-pressure vessel 25, and further positions the driving unit for driving the screw 46 of said screw transfer unit 43 are also positioned in the high-pressure vessel 25. Said driving unit is the hydraulic motor 44a.

According to Example 3, since there is no rotary shaft penetrating through the high-pressure vessel 25, and there is no need of the seal part as in the above examples, the molding apparatus 22 can be fabricated at a low cost.

The embodiments described in said Examples 1 to 3 are only examples, and the present invention is not limited to these examples. A core of the present invention is the technological concept to reduce the mechanical seal parts by locating at least the driving motor in the high-pressure vessel, and it is clear that modifications can be possible within the range not to depart from such concept.

That is, the mechanical seal part can be eliminated by positioning the driving unit 40 of the forming rolls 33a and 33b, the screw transfer unit 43, and the driving unit 44a of the screw transfer unit 43 in the high-pressure vessel 25, and thus the molding apparatus 22 can come to be fabricated at a low cost.

What is claimed is:

1. A gas hydrate compression molding apparatus comprising:
   a hopper which holds gas hydrate formed by the reaction of a raw material gas with a raw material water under a high pressure;
   a high-pressure vessel which is pressurizable to the gas hydrate-forming pressure;
   a pair of forming rolls positioned at the lower portion of an opening part of the hopper, wherein the forming rolls are positioned in the high-pressure vessel;
   a screw transfer unit which supplies gas hydrate powder in the hopper to the forming rolls, wherein the screw transfer unit is positioned in the high-pressure vessel;
   a driving unit for driving the forming rolls; and
   a driving unit for driving the screw transfer unit;
   wherein at least one of the driving unit for driving the forming rolls and the driving unit for driving the screw transfer unit is positioned in the high-pressure vessel.

2. The gas hydrate compression molding apparatus according to claim 1, wherein the driving unit for driving the forming rolls is positioned in the high-pressure vessel.

3. The gas hydrate compression molding apparatus according to claim 1, wherein at least one of the driving unit for driving the forming rolls and the driving machine for driving the screw transfer unit is a hydraulic motor.

4. The gas hydrate compression molding apparatus according to claim 1, wherein at least one of the driving unit for driving the forming rolls and the driving unit for driving the screw transfer unit comprises a hydraulic motor.

\* \* \* \* \*